(12) United States Patent
Finlay et al.

(10) Patent No.: US 7,099,864 B2
(45) Date of Patent: Aug. 29, 2006

(54) SYSTEM AND METHOD FOR SLOW MATERIALIZATION SORTING OF PARTIALLY ORDERED INPUTS IN A DATABASE SYSTEM

(75) Inventors: Ian Richard Finlay, Uxbridge (CA); Miroslaw Adam Flasza, Pickering (CA); John Frederick Hornibrook, Markham (CA); Adam J Storm, Thornhill (CA); Daniele Costante Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 10/427,776

(22) Filed: Apr. 30, 2003

(65) Prior Publication Data

US 2004/0220930 A1   Nov. 4, 2004

(51) Int. Cl.
*G06F 7/00* (2006.01)
*G06F 17/30* (2006.01)
(52) U.S. Cl. .............................................. 707/7; 707/5
(58) Field of Classification Search .................. 707/3, 707/1, 102, 7, 4, 5; 700/2
See application file for complete search history.

(56) References Cited

U.S. PATENT DOCUMENTS

| 5,204,967 A | 4/1993 | Armstrong ................... 395/800 |
| 5,797,000 A * | 8/1998 | Bhattacharya et al. .......... 707/2 |
| 5,812,817 A | 9/1998 | Hovis et al. ................. 395/497 |
| 5,924,092 A | 7/1999 | Johnson .......................... 707/7 |
| 6,055,542 A | 4/2000 | Nielsen et al. ............... 707/104 |
| 6,374,234 B1 | 4/2002 | Netz .............................. 707/2 |
| 6,775,682 B1 * | 8/2004 | Ballamkonda et al. ....... 707/102 |
| 2004/0122802 A1 * | 6/2004 | Allen et al. ..................... 707/3 |

OTHER PUBLICATIONS

Claussen et al., "Exploiting early sorting and early partitioning for decision support query processing", The VLDB Journal (2000) 9: pp. 190-213, Springer-Verlag, 2000.*
Gokhale, "Design of the 64-bit Option for the Oracle7 Relational Database Management System", Digital Technical Journal, vol. 8, No. 4, pp. 76-82, 1996.*
Li et al., "Fast joins using joins indices", The VLDB Journal (1999) 8, pp. 1-24, Springer-Verlag.*
"Effective Approach to Query I/O Parallelism Using Sequential Prefetch and Horizontal Data Partitions," IBM Technical Disclosure Bulletin, vol. 36, No. 09A, Sep. 1993.
J. Hellerstein, "Optimization Techniques for Queries Wurg Expensive Methods," ACM Transactions on Database Systems, vol. 23, No. 2, Jun. 1998, pp. 113-157.
S. Ganguly et al., "Query Optimization for Parallel Execution," 1992 ACM SIGMOD—Jun. 1992/CA, USA.

* cited by examiner

*Primary Examiner*—Jeffrey Gaffin
*Assistant Examiner*—Michael J. Hicks
(74) *Attorney, Agent, or Firm*—Samuel A. Kassatly

(57) ABSTRACT

The present system improves the performance of a query in a database system when a plan for the query comprises sorting an input that is at least partially sorted such that a slow materialization sort can be applied. The invention applies the slow materialization sort by determining a sequence of subsets in accordance with the partially sorted input. As each of the subsets is determined, the subset is output for further processing. Advantageously, the invention reduces the waiting period for obtaining results from a sorting operation under certain circumstances.

33 Claims, 3 Drawing Sheets

SYSTEM AND METHOD FOR SLOW MATERIALIZATION SORTING OF PARTIALLY ORDERED INPUTS IN A DATABASE SYSTEM

FIELD OF THE INVENTION

The present invention relates to databases in general. In particular, the present invention relates to a slow materialization sort of presorted inputs in a database system.

BACKGROUND OF THE INVENTION

A common form of an information retrieval system for managing computerized records contained in a database is a relational database management system. Between an actual database (that is, data stored for use by a computer) and users of an information retrieval system for managing is a software layer known as the relational database management system (RDBMS or DBMS). The RDBMS is responsible for handling all requests for access to the database and shielding the users from the details of any specific hardware and/or software implementation. Using relational techniques, the RDBMS stores, manipulates and retrieves data in table form. Typically, these relationships are defined by a set of columns and a set of rows. The columns are also referred to as attributes, or data types. The rows are also referred to as records or tuples, of data.

A standard language for dealing with DBMSs is the Structured Query Language (SQL). SQL comprises both data definition operations and data manipulation operations. To maintain data independence, a set of SQL commands, referred to as a query, provides the RDBMS with instructions to perform. However, the query does not describe directions for performing the instructions. Thus, the RDBMS comprises a query processor for generating various query plans of execution and choosing a preferred plan. Due to the high-level nature of relational expressions and a variety of implementation techniques, automatic query optimization is possible and often necessary to ensure efficient query processing.

In accordance with well-known query translation processes, an SQL query is processed in stages. The initial stage casts the source query into an internal form such as the Query Graph Model (QGM) following the preliminary steps of lexing, parsing and semantic checking. The goal of the QGM is to provide a more powerful and conceptually more manageable representation of queries to reduce the complexity of query compilation and optimization. The internal QGM is a data structure for providing the semantic relationships of the query for use by query translator and optimizer components for rewriting the query in a canonical form. A plan optimizer produces a query execution plan such as by generating alternate plans and choosing a best plan based on estimated execution costs. A plan refinement stage may be employed to refine the optimum execution plan in accordance with run-time requirements.

Often, for the query results to be utilized in a meaningful way, the query is also sorted. However, database tables can be very large and processing tables for sorting can be expensive in terms of computer resources. Therefore, it is important that techniques for sorting tables be as efficient as possible.

Known database systems provide a sorting operation that executes completely on a table. That is, when a sorting operation is used in executing an application such as a query plan in a database system, output rows are returned from the sorting operation only when the sorting operation has been executed on the entire table. Thus, the sorting operation acts as a barrier for outputting rows. Consequently, the application or query waits until the sorting operation is completed before receiving any sorted rows. This waiting period increases the application execution time, which may be especially high for external sorting operations. External sorting operations are generally performed when the data to be sorted is too large to place in a main memory. Such sorting operations seek to minimize disk accesses for the sort. What is therefore needed is a system and associated method that reduce the waiting time for sorting operations executed on tables. The need for such system and method has heretofore remained unsatisfied.

SUMMARY OF THE INVENTION

The present invention satisfies this need, and presents a system, a computer program product, and an associated method (collectively referred to herein as "the system" or "the present system") for providing an information retrieval system for a slow materialization sort of a partially presorted input for effectively pipelining a query. Advantageously, the invention reduces the waiting period for obtaining results from a sorting operation under certain circumstances. Thus, applications may access sorted rows faster than previously possible for performing subsequent operations, reducing overall application execution time.

In accordance with an aspect of the present embodiment, there is provided, for an information retrieval system adapted to process a query having an associated plan, the associated plan comprises sorting an input that is at least partially sorted such that a slow materialization sort can be applied, a method of applying the slow materialization sort, the method comprising determining a sequence of subsets in accordance with the partially sorted input, and, outputting the subset for further processing, as each of the subsets is determined.

In accordance with another aspect of the invention, there is provided an information retrieval system adapted to process a query having an associated plan, the associated plan comprises sorting an input that is at least partially sorted such that a slow materialization sort can be applied, the information retrieval system for applying the slow materialization sort, the information retrieval system comprising means for determining a sequence of subsets in accordance with the partially sorted input, and, means for outputting the subset for further processing, as each of the subsets is determined.

In accordance with yet another aspect of the invention, there is provided a computer program product having a computer readable medium tangibly embodying computer executable code for directing an information retrieval system to apply a slow materialization sort, the information retrieval system adapted to process a query having an associated plan, the associated plan comprises sorting an input that is at least partially sorted such that a slow materialization sort can be applied, the computer program product comprising code for determining a sequence of subsets in accordance with the partially sorted input, and, code for outputting the subset for further processing, as each of the subsets is determined.

In accordance with yet another aspect of the invention, there is provided an article comprising a computer readable modulated carrier signal being usable over a network, and comprising means embedded in the computer readable modulated carrier signal for directing an information retrieval system to apply a slow materialization sort, the information retrieval system adapted to process a query having an associated plan, the associated plan comprises sorting an input that is at least partially sorted such that a slow materialization sort can be applied, the article comprising means in the medium for determining a sequence of subsets in accordance with the partially sorted input, and, means in the medium for outputting the subset for further processing, as each of the subsets is determined.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the Operating System (OS) provides the facilities that may support the requirements of the present invention. A preferred embodiment is implemented in the C or C++ computer programming language (or other computer programming languages in conjunction with C/C++). Any limitations presented would be a result of a particular type of operating system or computer programming language, or data processing system and would not be a limitation of the present invention.

Figures 1, 3:
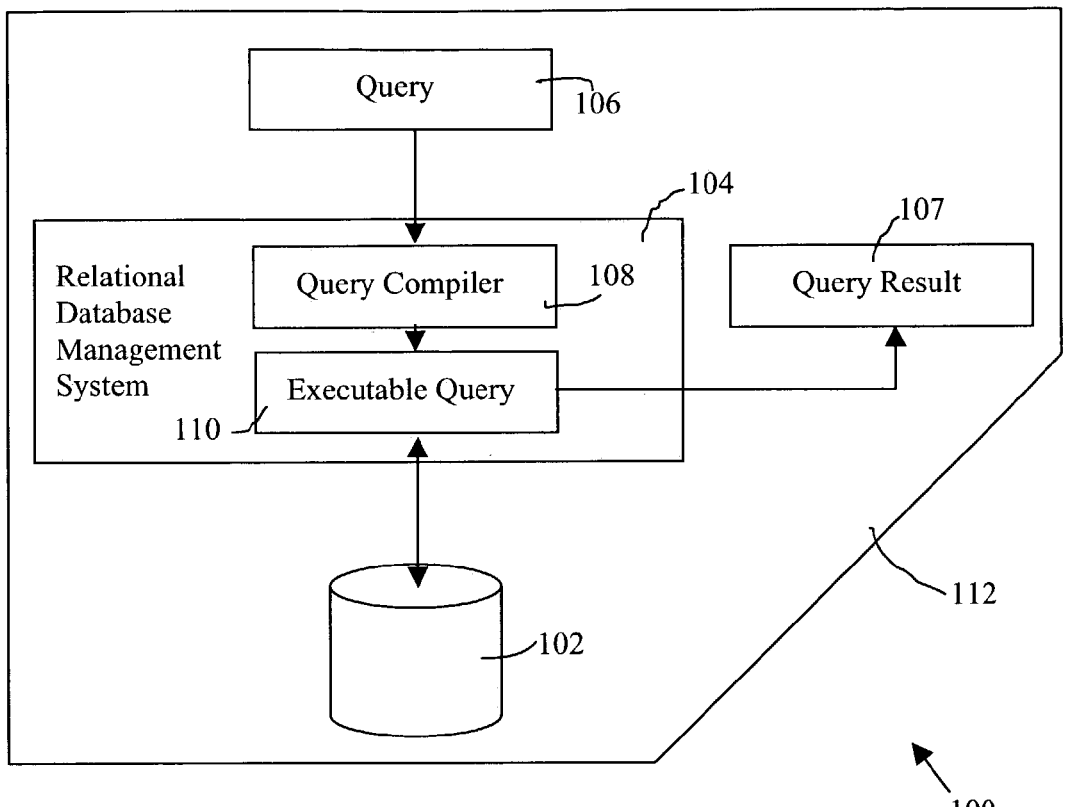
FIG. 1 is a schematic illustration of an exemplary operating environment in which a slow materialization sorting system of the present invention can be used.
FIG. 3 is a table representing a sample, presorted table eligible for a slow materialization sort in accordance with an embodiment of the invention.

FIG. 1 portrays an exemplary overall environment in which a system and associated method for slow materialization sorting of partially ordered inputs in a database system according to the present invention may be used. A data processing system 100 comprises a memory 112 for storing a database 102, an information retrieval system shown as a relational database management system (RDBMS) 104, a query 106 and a query result 107. The RDBMS further comprises a query compiler 108 for reading the query 106 and subsequently generating an executable query 110. Output of the executable query 110 is the query result 107.

The invention provides a slow materialization sort of a partially ordered input in a database system for effectively pipelining a query. The slow materialization sort system and method includes a software programming code or computer program product that is typically embedded within, or installed on a computer. Alternatively, the slow materialization sort can be saved on a suitable storage medium such as a diskette, a CD, a hard drive, or like devices. A slow materialization sort averts wasting central processor unit (CPU) and disk resources and reduces spilling large sorts of already ordered data. A slow materialization sort is a sort performed on a stream of data, or input, that is already in at least a partially desired order. It is used to accumulate a subset of the sort, and then have that subset consumed, while the remainder of the sort proceeds. Thus, it is possible for rows to be output from the sort while the sort is still executing.

However, the ability to provide a slow materialization sort relies on the input being at least partially ordered. The following is a general description of a slow materialization sort in accordance with an embodiment of the invention.

In the present embodiment, a query desires a sort for a set of records, where the records comprise columns or fields $C1$, $C2$, $C3$, . . . $Cn$ for some integer value of $n>1$. The input records are to be sorted on columns $C1$, $C2$, . . . , $Cm$, where $m \leq n$ and $m>1$. The input records are already partially sorted. Specifically, the records are presorted on $C1$, $C2$, . . . , $Cj$, where $1 \leq j \leq m$. Therefore, if $m=j$, an easy solution is to feed the input to the output since it is already sorted as desired. Columns $C1$, $C2$, . . . , $Cn$ refer to a specific, predefined order of columns and not necessarily to contiguous columns.

Figure 2:
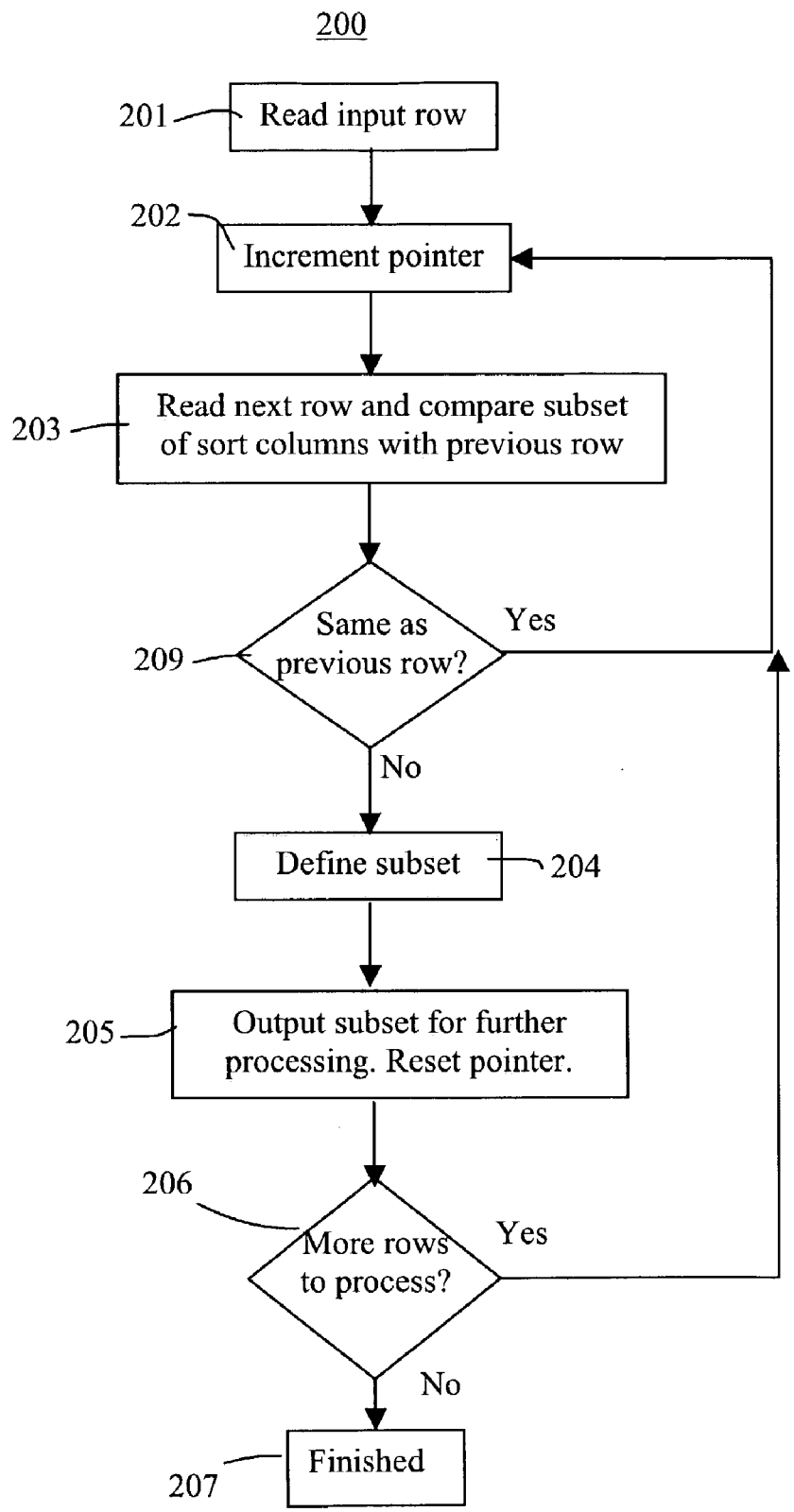
FIG. 2 is a process flow chart illustrating operation of a method for a slow materialization sort in accordance with an embodiment of the invention.

Referring to FIG. 2, a flow chart illustrating operation of a method for the slow materialization sort is shown generally by numeral 200. Step S201 comprises reading an input row $C1$, $C2$, $C3$, . . . , $Cn$ into memory and noting values for $C1$, . . . , $Cj$. Step S202 comprises incrementing a row indicator or pointer. Step S203 comprises reading a subsequent row into memory and comparing its values for $C1$, . . . , $Cj$ with the previous row's values for values for $C1$, . . . , $Cj$. In step S209, if the values are the same, a subsequent row is read into memory and the steps S202 and S203 are repeated until the values differ. Once it is determined at step S209 that the values differ for $C1$, . . . , $Cj$, the operation proceeds to step S204. Step S204 comprises determining a subset of rows. It is known that a subset of rows having the same values for $C1$, . . . , $Cj$ is stored in memory. Further, it is known that the input is sorted in accordance with $C1$, . . . , $Cj$, and all rows having the same values for $C1$, . . . , $Cj$ are grouped together. Thus, there are no more rows in the input that can have the same values for $C1$, . . . , $Cj$ as those stored in the subset.

In step S205, the subset of rows determined in step S204 is output for performing subsequent operation on the data. In the present embodiment, the subsequent operations order the data in accordance with the values for $Cj+1$, . . . , $Cm$. The sorting methods used for the subsequent operations ordering the data comprise standard and proprietary sorting methods, as may be appreciated by a person skilled in the art and may further comprise internal and external sorts.

In step S206, a check is made to determine if more rows are available for processing. If more rows are available, processing proceeds to step S202. If no further rows exist for processing, then processing ends at step S207.

Concurrently with the subsequent operations ordering the data, the row indicator is incremented in step S202. In step S203 a subsequent row from the table is read into memory. Steps S202 to S204 are repeated for a second subset of rows. The entire process is repeated until all rows in the input table are sorted. Therefore, the sort outputs subsets of rows as they are determined so the application can begin to receive results quickly, even while the slow materialization sort is still executing.

Referring to FIG. 3, a sample table T1 is shown for illustrating the operations described above. The table T1 comprises three columns C1, C2, and C3 and a plurality of rows R1, R2, etc. The table T1 is indexed in accordance with column C1. Thus, the table T1 is sorted in accordance with column C1, but not columns C2 and C3. A query is applied to the table T1 as follows:

select * from T1 where C1≧100 order by C1, C2, C3

Since the table T1 is indexed on C1, it is easy to determine for which of the rows R1, R2, etc. the predicate C1>100 is true. In the present example, only the first row R1 does not satisfy the predicate. The second row R2 is read into memory and its value for C1, that is 100, is noted. The third row R3 is read into memory and its value for C1 is compared with the previous row's value for C1. Since the values are the same, the fourth row R4 is read into memory and its value for C1 is compared with the previous row's value for C1. This continues until the sixth row R6, which has a value of 101 for C1. Accordingly, since the table is indexed and thus ordered on column C1, there are no more rows R1, R2, etc. having a value of 100 in the table T1. Thus, a first subset comprises the second row R2 through fifth row R5 in the table T1. This subset is then sorted in accordance with column C2 and then column C3. Once the subset is completely sorted it is returned as output.

While the first subset is being sorted further, the process continues sorting the table T1. The seventh row R7 is read into memory and its value for C1 is compared with the value of the previous row R6 for C1. This continues until the next mismatch, which occurs for the eleventh row R11, which has a value of 103. Thus, a second subset comprises the sixth row R6 through tenth row R10 in the table T1. This subset is then further sorted in accordance with columns C2 and C3. Once the subset is completely sorted it is returned as output.

The operations described above continue until the last row is read from the table. Thus, it can be seen that the slow materialization sort effectively pipelines the sort, resulting in a faster throughput for the query.

It may be appreciated by one skilled in the art, that the sorting on columns C2, C3 can also occur with their acceptance into the subset being accumulated and not as a separate process after the subset is established. For example, step S202 could also comprise processing to insert the row into a sort. Thus, when the subset is output for further processing at step S205, the output is a completed sort on the subset. The operation resets the SORT for the next subset.

The operation described above is fairly rigid in that it requires that the presorted portion of the table be the highest order of the required sort. That is, if the sort is required for columns C1, C2, . . . Cm, only tables presorted as C1, C2 . . . Cj, where j<m, can be applied. Thus, for the example described with reference to FIG. 2, if the table T1 was sorted on C2 instead of C1, it would not be possible to apply the slow materialization sort.

However, for operations such as GROUP BY in a database system, a sort is required but the column order of the sort is not important for sorting and grouping the output. This characteristic can be exploited for improving the flexibility of the slow materialization sort by rearranging the order of the sort in the query to suit the order in which the table is partially sorted. The following is a general description how this characteristic can be exploited for a GROUP BY operation.

A GROUP BY operation specifies a sort on columns C1, . . . , Cm, and the input is sorted on Ci1, Ci2, . . . , Cij, where 1<=j<m, Cix <> Ciy for ix <> iy, i1<=ix<=ij and i1<=iy<=ij. That is, the input is sorted on columns in a different order than that specified by the GROUP BY operation. However, since the order of a sort in a GROUP BY operation is inconsequential, the rows can be sorted on any permutation of C1, . . . , Cm. For example, a valid sort order could be Cm, Cm−1, . . . , C2, C1, which reverses the columns, and sorts on Cm first.

Thus, for such "permutable" sorts, a strategy is to permute the sort columns in the query for arranging the column in order such that Ci1, . . . , Cij are the first sort columns in the query. The remaining columns in the sort Cij+1, . . . , Cm can be placed next, in any order. This new sort order allows a slow materialization sort to execute using the operations described with reference to FIG. 2.

The costs of the different sorts that could be generated by the optimizer, that is sorts using the original sort order and the new sort order, are evaluated. The optimizer selects the sort that is the most efficient with respect to a predefined estimated performance metric, such as response time.

An example of reorganizing a GROUP BY operation is given as follows. A query is provided for counting the number of rows in tables R and F that have an equivalent value in column A, for each value that satisfies a predefined predicate. Specifically, the query is given as follows:

Select R.A, R.B, count (*) from R, F where R.A=F.A group by R.B, R.A

Further, an index is available only on column A of table R. Therefore, if it was required to strictly adhere to the order of the sort, a slow materialization sort would not be applicable since the slow materialization sort is applied first to column B of table R. However, since a GROUP BY operation does not depend on the order of the columns of the sort, the query can effectively be reordered without adversely affecting the results as follows:

Select R.A, R.B, count (*) from R, F where R.A=F.A group by R.A, R.B

Since the sort to be performed is on a partially sorted list, that is the index of table R on column A provides the ordering for R.A, the slow materialization sort of the present invention can be applied. As each subset is determined by the slow materialization sort, the subset is returned for further processing by the query. Thus, the result of the query can be determined faster than if a slow materialization sort had not been used.

In yet an alternate embodiment, the slow materialization sort can be used for assisting with symmetric multiprocessing (SMP). SMP generally refers to processing of programs by multiple processors that share a common operating system and memory. To efficiently run a query using SMP, it is necessary to SMP parallelize a plan. When SMP parallelizing a plan, it is sometimes necessary to introduce a sort to partition data for a join or for rebalancing workload between processors, or agents. Currently, even though a stream is properly ordered a sort still has to be performed before proceeding with the execution of the query. Consequently, the agents have to wait until the sort is completed before proceeding.

However, by using the slow materialization sort agents can take advantage of the fact that each subset is complete for the indexed column. Thus once each subset is complete, the subset of data is available to one or more of the agents for further processing. The sort operation required for SMP is an inter-partition parallelism sort on a data stream that already has the order that would be imposed by the sort. Thus, using the slow materialization sort provides the added function that an SMP agent that has been populating the sort occasionally checks its own sort bin to determining the presence of a record. If the SMP agent finds such a record, it stops processing the sort and instead processes the record in its sort bin. When an agent checks its sort bin and the bin is empty, the agent checks the plan to determine if the slow materialization sort is complete. If the slow materialization sort is incomplete, the agent proceeds to sort the next section of the index. This continues until either a record is found in the agent's sort bin, or the input to the sort is exhausted, as is described in detail below.

Figure 4:
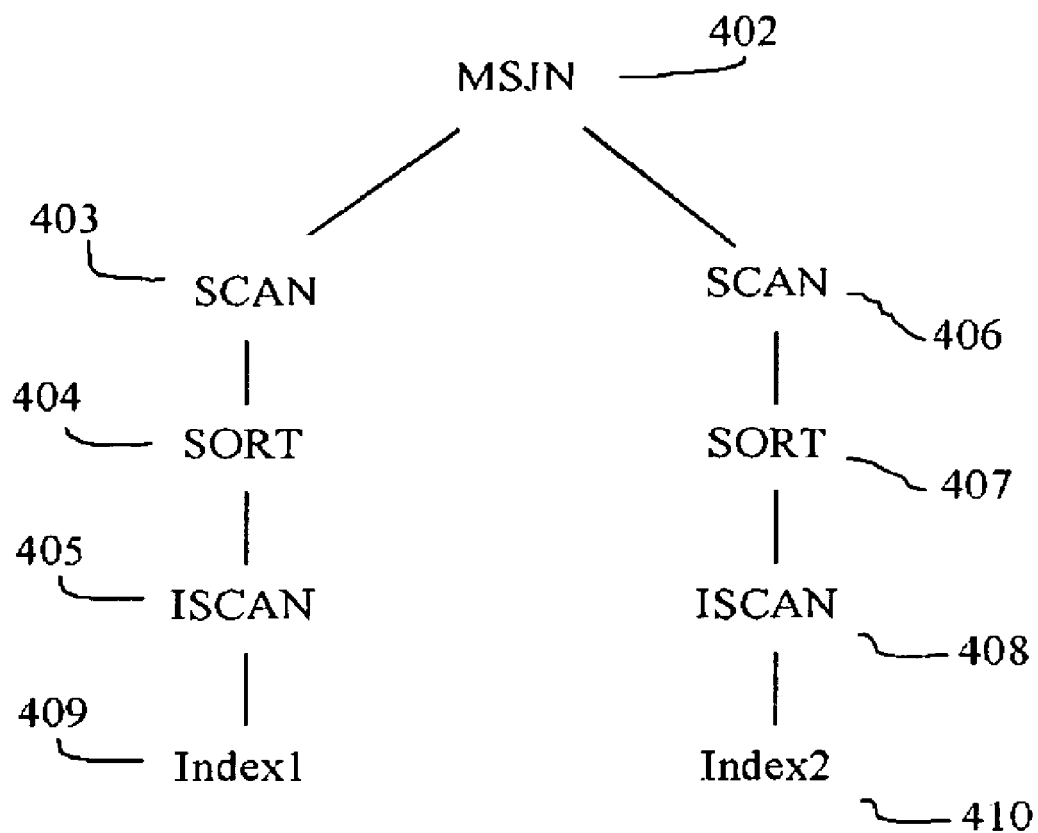
FIG. 4 is a diagram illustrating an exemplary optimizer plan in accordance with an embodiment of the invention.

Referring to FIG. 4, an optimizer plan is illustrated generally by numeral 400. The optimizer plan shown is designed for two agents, AGENT#1 and AGENT#2. One of the techniques that Inter Partition Parallelism uses to perform a Merge Scan Join (MSJN) is to data partition inputs to the MSJN such that each agent can perform the join for its own partition. The first partition for the first agent AGENT#1 comprises a SCAN 403, a SORT 404, an index SCAN (ISCAN) 405, and a first index Index1 409. Similarly, the second partition for the second agent AGENT#2 comprises a SCAN 406, a SORT 407, an ISCAN 408 and a second index Index2 410.

SORT 404 and SORT 407 are slow materialization SORTs. AGENT#1 starts the ISCAN 405. AGENT#1 reads rows from Index1 409 for insertion into SORT 404. SORT 404 performs a slow materialization sort on the index Index1 409 based on the column used in the MSJN 402 predicate. Once a subset is completed, the rows in the subset are hashed into one of two SORT Bins, Bin#1 or Bin#2, one for each of the two agents involved. A hashing algorithm hashes the sorted rows in the two bins for dividing work evenly between the agents performing the join. Once AGENT#1 completes sorting the first subset, it checks its SORT Bin, SORT 404, Bin#1. If the bin is empty, it sorts the next subset of rows from the index Index1 409.

When AGENT#1 finds a row in its SORT Bin, SORT 404, Bin#1, it proceeds to the SCAN 403, which reads the row from SORT 404, Bin#1. AGENT#1 then processes the MSJN 402, which causes AGENT#1 to try to read from SORT 407, Bin#1 for applying the MSJN.

If SORT 407, Bin#1 is empty, AGENT#1 starts the ISCAN 408. As with ISCAN 405, AGENT#1 selects rows from index Index2 410, for inserting into SORT 407. A slow materialization sort is performed by SORT 407 and the next subset resulting from the SORT 407 is hashed into one of two SORT bins, Bin#1 and Bin#2. Once AGENT#1 finishes with the subset of rows from the index Index2 410, it checks SORT 407, Bin#1. If the bin is empty, it reads and sorts the next subset of rows from the index Index2 410.

When AGENT#1 finds a row in its SORT Bin, SORT 407, Bin#1, it proceeds to the SCAN 406, which reads the row from SORT 407, Bin#1. AGENT#1 then processes the MSJN 402 that joins the output of SORT 404, Bin#1 with the output of SORT 407, Bin#1.

Concurrently, AGENT#2 performs the same functions as AGENT#1. That is, AGENT#2 reads rows from Index2 410 for insertion into SORT 407. SORT 407 performs a slow materialization sort on the index Index2 410 based on the column used in the MSJN 402 predicate. Once a subset is completed, the rows in the subset are hashed into one of two SORT Bins, Bin#1 or Bin#2, one for each of the two agents involved. A hashing algorithm hashes the sorted rows in the two bins. Once AGENT#2 completes sorting the first subset, it checks its SORT Bin, SORT 407, Bin#2. If the bin is empty, it sorts the next subset of rows from the index Index2 410.

When AGENT#2 finds a row in SORT 404, Bin#2, it proceeds to SCAN 403 and processes the MLJN 402. The MLJN causes AGENT#2 to try to read from SORT 404, Bin#2 for applying the MSJN. If the read of SORT 407, Bin#2 fails, AGENT#2 reads ISCAN 405, sorts the next subset using SORT 404, and hashes the rows into the appropriate bins. When AGENT#2 finds a row in its SORT Bin, SORT 404, Bin#2, it proceeds to the SCAN 403, which reads the row from SORT 404, Bin#2. AGENT#2 then processes the MSJN 402, which joins the output of SORT 407, Bin#2 with the output of SORT 404, Bin#2.

The two agents continue to work between the two SORTs 404 and 407 until they have completed processing the MSJN 402. Using a slow materialization sort for processing a SMP parallelization plan benefits greatly from an early stop capability of MSJN, whereby a MSJN may stop processing an inner or outer join if the outer or inner join has been exhausted. A fully materialized sort, that is a sort wherein an entire input stream is processed before results are output, cannot benefit from this feature since by the time sort is complete, it is too late to apply an early stop decision.

One key challenge is ensuring SMP agents remain appropriately synchronized through the operation of the slow materialization sort. If one should happen to get 'stuck', overloaded, or poorly balanced, a sort bucket may be spilled to disk. To inhibit such expensive disk accesses, one simple control is to have all of the agents stop and wait for the other agent to read from its SORT Bin. Alternately, a dynamic rebalancing of the two slow materialization sorts could be allowed for redistributing the rows more evenly among the agents. Alternatively, an adaptive hashing algorithm may be employed. While the slow materialization sort for SMP is described with reference to two agents and the number of sorts and joins illustrated in FIG. 4, a person of ordinary skill in the art may appreciate the exemplary nature of this description.

It may be appreciated that persons skilled in the art may implement an aspect of the invention as a computer program product having a computer-readable medium tangibly embodying computer executable instructions for directing a data processing system to implement the method(s) described above. It may be appreciated that the computer program product may be a floppy disk, hard disk or other medium for long term storage of the computer executable instructions.

It may be appreciated that persons skilled in the art may implement an aspect of the invention as a computer-readable signal-bearing medium, and having means in the medium for directing a data processing system to implement any method(s) described above. It may be appreciated that a supplier of the compiler may upload the article to a network (such as the Internet) and users may download the article via the network to their respective data processing systems.

It is to be understood that the specific embodiments of the invention that have been described are merely illustrative of certain application of the principle of the present invention. Numerous modifications may be made to the system and method for slow materialization sorting of partially ordered inputs in a database system invention described herein without departing from the spirit and scope of the present invention.

What is claimed is:

1. A processor-implemented information retrieval system for processing a query having an associated plan, the associated plan comprises sorting an input that is at least partially sorted so that a slow materialization sort can be applied, a method of applying the slow materialization sort, comprising:

determining a sequence of subsets in accordance with the partially sorted input;

sorting each of the subsets upon accumulation of the subset; and outputting each of the subsets for further processing, as each of the subsets is sorted while the slow materialization sort of remaining subsets of the input continues to be implemented.

2. The method of claim 1 further comprising a first step of evaluating whether the slow materialization sort can be applied to the input.

3. The method of claim 2, wherein the first step of evaluating comprises verifying that the input is partially sorted in the same order as the sort required by the query.

4. The method of claim 3 further comprising a second step of evaluating the query, if the input is partially sorted in a different order to the sort desired by the query, for determining if the sort required by the query can be reordered without adversely affecting the query results.

5. The method of claim 4 further comprising applying the slow materialization sort to the reordered query, if the sort required by the query can be reordered.

6. The method of claim 1, wherein the sort required by the query is used for symmetric multiprocessing parallelizing the plan for use by a plurality of processors sharing a memory.

7. The method of claim 6, wherein each of the processors applies the slow materialization sort to a predefined portion of the memory and distributes sorted data to a plurality of associated sort bins.

8. The method as defined in claim 7, wherein the sorted data is distributed to the plurality of associated sort bins in accordance with a predefined hashing function.

9. The method of claim 7, wherein for each processor, after a subset is defined, the processor determines whether it has data to process in its associated sort bin.

10. The method of claim 9, wherein if the processor determines it has data to process, the data is processed before a subsequent subset is determined.

11. The method of claim 9, wherein if the processor determines it has no data to process, a subsequent subset is determined.

12. An information retrieval system adapted to process a query having an associated plan, the associated plan comprises sorting an input that is at least partially sorted so that a slow materialization sort can be applied, the information retrieval system for applying the slow materialization sort comprising:
    means for determining a sequence of subsets in accordance with the partially sorted input;
    means for sorting each of the subsets upon accumulation of the subset; and
    means for outputting each of the subsets for further processing, as each of the subsets is sorted while the slow materialization sort of remaining subsets of the input continues to be implemented.

13. The information retrieval system of claim 12 further comprising first evaluating means for evaluating whether the slow materialization sort can be applied to the input.

14. The information retrieval system of claim 13, wherein the first evaluating means for evaluating comprises verifying that the input is partially sorted in the same order as the sort required by the query.

15. The information retrieval system of claim 14 further comprising second evaluating means for evaluating the query, if the input is partially sorted in a different order to the sort desired by the query, for determining if the sort required by the query can be reordered without adversely affecting the query results.

16. The information retrieval system of claim 15 further comprising means for applying the slow materialization sort to the reordered query, if the sort required by the query can be reordered.

17. The information retrieval system of claim 12, wherein the sort required by the query is used for symmetric multiprocessing parallelizing the plan for use by a plurality of processors sharing a memory.

18. The information retrieval system of claim 17, wherein each of the processors applies the slow materialization sort to a predefined portion of the memory and distributes sorted data to a plurality of associated sort bins.

19. The information retrieval system as defined in claim 18, wherein the sorted data is distributed to the plurality of associated sort bins in accordance with a predefined hashing function.

20. The information retrieval system of claim 18, wherein for each processor, after a subset is defined the processor determines whether it has data to process in its associated sort bin.

21. The information retrieval system of claim 20, wherein if the processor determines it has data to process, the data is processed before a subsequent subset is determined.

22. The information retrieval system of claim 20, wherein if the processor determines it has no data to process, a subsequent subset is determined.

23. A computer program product having a plurality of executable instruction codes that are stored on a computer-useable medium for directing an information retrieval system to apply a slow materialization sort, the information retrieval system processes a query having an associated plan comprising sorting an input that is at least partially sorted so that a slow materialization sort can be applied, the computer program product comprising:
    a first set of instruction codes for determining a sequence of subsets in accordance with the partially sorted input;
    the first set of instruction codes further sorting each of the subsets upon accumulation of the subset; and
    a second set of instruction codes for outputting each of the subsets for further processing, as each of the subsets is sorted while the slow materialization sort of remaining subsets of the input continues to be implemented.

24. The computer program product of claim 23 further comprising a third set of instruction codes for evaluating whether the slow materialization sort can be applied to the input.

25. The computer program product of claim 24, wherein the third set of instruction codes verifies that the input is partially sorted in the same order as the sort required by the query.

26. The computer program product of claim 25 further comprising a fourth set of instruction codes for evaluating the query, if the input is partially sorted in a different order to the sort desired by the query, for determining if the sort required by the query can be reordered without adversely affecting the query results.

27. The computer program product of claim 26 further comprising a fifth set of instruction codes for applying the slow materialization sort to the reordered query, if the sort required by the query can be reordered.

28. The computer program product of claim 23, wherein the sort required by the query is used for symmetric multiprocessing parallelizing the plan for use by a plurality of processors sharing a memory.

29. The computer program product of claim 28, wherein each processor applies the slow materialization sort to a predefined portion of the memory and distributes sorted data to a plurality of associated sort bins.

30. The computer program product as defined in claim 29, wherein the sorted data is distributed to the plurality of associated sort bins in accordance with a predefined hashing function.

31. The computer program product of claim 29, wherein for each processor, after a subset is defined the processor determines whether it has data to process in its associated sort bin.

32. The computer program product of claim 30, wherein if the processor determines it has data to process, the data is processed before a subsequent subset is determined.

33. A computer program product of claim 31, wherein if the processor determines it has no data to process, a subsequent subset is determined.

* * * * *